US007007281B2

(12) United States Patent
Gajewska et al.

(10) Patent No.: US 7,007,281 B2
(45) Date of Patent: Feb. 28, 2006

(54) HEURISTIC FOR GENERATING OPPOSITE INFORMATION FOR INCLUSION IN FOCUS EVENTS

(75) Inventors: Hania Gajewska, Woodside, CA (US); David P. Mendenhall, New York, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 815 days.

(21) Appl. No.: 09/863,058

(22) Filed: May 22, 2001

(65) Prior Publication Data

US 2002/0175951 A1 Nov. 28, 2002

(51) Int. Cl.
*G06F 9/46* (2006.01)

(52) U.S. Cl. ...................................................... 719/318

(58) Field of Classification Search ................ 719/318, 719/319, 320; 345/802, 781; 717/100, 114; 715/802, 781

See application file for complete search history.

(56) References Cited

U.S. PATENT DOCUMENTS

| | | | | |
|---|---|---|---|---|
| 5,377,317 | A * | 12/1994 | Bates et al. | 345/789 |
| 5,625,763 | A * | 4/1997 | Cirne | 345/767 |
| 5,634,124 | A * | 5/1997 | Khoyi et al. | 707/103 R |
| 5,687,331 | A * | 11/1997 | Volk et al. | 345/840 |
| 5,724,589 | A * | 3/1998 | Wold | 719/318 |
| 5,872,973 | A * | 2/1999 | Mitchell et al. | 719/332 |
| 6,249,284 | B1 * | 6/2001 | Bogdan | 345/764 |
| 6,262,713 | B1 * | 7/2001 | Brusky et al. | 345/158 |
| 6,606,106 | B1 * | 8/2003 | Mendenhall et al. | 345/854 |
| 6,614,457 | B1 * | 9/2003 | Sanada et al. | 715/840 |
| 6,625,804 | B1 * | 9/2003 | Ringseth et al. | 717/114 |
| 6,654,038 | B1 * | 11/2003 | Gajewska et al. | 345/802 |
| 6,677,933 | B1 * | 1/2004 | Yogaratnam | 345/174 |
| 6,892,360 | B1 * | 5/2005 | Pabla et al. | 715/802 |
| 2002/0175952 | A1 * | 11/2002 | Gajewska et al. | 345/802 |

FOREIGN PATENT DOCUMENTS

EP 0 869 421 A2 10/1998

OTHER PUBLICATIONS

IBM TDB, "Technique to Move Focus in Presentation Manager Applications", vol. 34, No. 11, Apr. 1992, pp. 278-279.*

UNKNOWN; "*WM_SETFOCUS*"; Microsoft Windows 32 Application Programming Interface; Online! 1997; XP002261664; (1 page).

UNKNOWN; "*WM_KILLFOCUS*"; Microsoft Windows 32 Application Programming Interface; Online ! 1997; XP002261665 (1 page).

McCulley, M.; "*Focus on Swing*"; Java World; Jul. 1998; XP002194913 (9 pages).

International Search Report dated Dec. 10, 2003; (4 pages).

* cited by examiner

*Primary Examiner*—Sue Lao
(74) *Attorney, Agent, or Firm*—Osha Liang LLP

(57) ABSTRACT

A method for generating information for inclusion in focus events includes maintaining a list of components requesting focus in a selected application, determining whether a target of a first focus event matches a component at a head of the list, and if the target of the first focus event matches the component at the head of the list, marking the component at the head of the list for inclusion in an opposite field of a second focus event.

38 Claims, 10 Drawing Sheets

HEURISTIC FOR GENERATING OPPOSITE INFORMATION FOR INCLUSION IN FOCUS EVENTS

BACKGROUND OF INVENTION

1. Field of the Invention

The invention relates generally to windowing toolkits for computers.

2. Background Art

The basic functionality of a computer is dictated both by the hardware of the computer and by the type of operating system it uses. Various operating systems exist in the marketplace, including Solaris from Sun Microsystems, Inc., MacOS from Apple Computer, Inc., the "Windows" operating systems, e.g., Windows® 95/98 and Windows NT®, from Microsoft Corporation, and Linux. A given combination of computer hardware, an operating system, and a windowing system will be referred to herein as a "platform." Prior to the popularity of the Internet, software developers wrote programs specifically designed to run on specific platforms. Thus, a program written for one platform could not be run on another. However, the advent of the Internet made cross-platform compatibility a necessity.

Prior art FIG. 1 illustrates a conceptual arrangement wherein a first computer 3 running the Solaris platform and a second computer 5 running the Windows® 98 platform are connected to a server 9 via the Internet 7. A resource provider using the server 9 might be any type of business, governmental, or educational institution. The resource provider has a need to provide its resources to both the user of the Solaris platform and the user of the Windows® 98 platform, but does not have the luxury of being able to custom-design its content for the individual platforms.

The Java™ programming language was developed by Sun Microsystems to address this problem. The Java™ programming language was designed to be simple for the programmer to use, yet to be able to run securely over a network and work on a wide range of platforms.

Prior art FIG. 2 illustrates how to create a Java™ application. In order to create a Java™ application, the developer first writes the application in human-readable Java™ source code. As used herein, the term "application" refers to both true Java™ applications and Java™ "applets," which are essentially small applications usually embedded in a web page. In the example shown, the application "Program" 11 is created as a human-readable text file. The name of this text file is given the required extension ".java".

A Java™ compiler 13, such as "javac" available from Sun Microsystems, Inc., is used to compile the source code into a machine-readable binary file 15. The source text file 11 will contain Java™ language commands, e.g., "import java.awt.Frame". A discussion of the Java™ language itself is beyond the scope of this document. However, complete information regarding the Java™ programming language is available from Sun Microsystems, both in print and via the Internet at java.sun.com. The resulting binary file 15 will automatically receive the same file name as the source text file 11, but will use ".class" as the trailing extension.

The Java™ runtime environment incorporates a Java™ "virtual machine" ("JVM") 16 to convert the ".class" byte codes into actual machine executions 17. The machine executions (like drawing windows, buttons, and user prompt fields) will occur in accordance to the application developer's code instructions. Because Sun Microsystems specifically designed the JVM to run on different platforms, a single set of ".class" byte codes will execute on any platform where a JVM has been installed. An Internet browser such as Netscape Navigator or Microsoft Internet Explorer that incorporates a JVM is called a "Java™-enabled" browser.

The cross-platform architecture of the Java™ programming language is illustrated in prior art FIG. 3, which shows how the Java™ language enables cross-platform applications over the Internet. In the figure, the Solaris platform 3 and the Windows® 98 platform 5 are each provided with a Java™ virtual machine ("JVM") 21. The resource provider creates a Java™ application using the Java™ software development kit ("SDK") 23 and makes the compiled Java™ byte codes available on the server 9. Through standard Internet protocols, both the computer 3 and the computer 5 may obtain a copy of the same byte codes and, despite the difference in platforms, execute the byte codes through their respective JVMs.

Typical computer applications, including most Java™ applications, provide graphical user interfaces, or GUIs. A GUI consists of graphical components, such as windows, buttons, and text fields displayed on the screen. The user interacts with an application by means of the GUI, clicking on the buttons or typing text into the text fields.

Platforms, including the Java™ platform, provide the developer convenient means for writing the GUI portions of applications in the form of user interface toolkits. Such toolkits typically include a set of pre-built graphical components (buttons, text fields, etc.) that the developer uses to build applications. The toolkits may also provide mechanisms for other functions. One such function is keeping track of which component will receive keyboard input typed by the user. Typically, at any given time, keyboard input will be directed to one special component, called the "focused component" or "focus owner". This component may be distinguished in appearance by a highlight or a blinking caret. The user may change which component is the focused component, typically by using the mouse to click on the desired new focus owner. Many user interface toolkits will interpret such mouse clicks and respond by resetting the focus owner to the clicked-on component.

Modem platforms provide facilities for multiple graphical applications to be running at the same time, and each application may present the user with multiple windows. Therefore, a typical display will show many windows simultaneously. One of these windows will usually be distinguished, typically with a darkened titlebar, as the "active window". The active window is the window with which the user is currently interacting. It will contain the focused component, if there is one.

Prior art FIG. 4 illustrates an exemplary display on a screen 31 including windows 33, 34, and 35. Each window includes a title bar 37 for displaying the title of the window and, if applicable, a menu bar 39 containing a number of pull down menu buttons defined by the developer. In this example, window 34 is the active window, as indicated by its darkened title bar. Windows 33 and 35 are inactive as indicated by their grayed out title bars. The text field 61 in window 34 is the focus owner, as indicated by the caret (which may be blinking, to further draw the user's attention). The window 33 includes a number of typical components, including "radio buttons" 41 which in this case allow the user to select a prefix, a text field 43 for entering a name, and an address field 45 for entering an address. Component 47 is a "chooser" that allows the user to choose a state. "Check boxes" 49 allow the user to select one or all of the options that apply. Associated with these check boxes are additional radio buttons 51 and 53 that allow the user to select a desired means of transmission. If the "QUOTE"

check box 49 is selected and the telephone radio button is selected, the window 34 appears allowing the user to enter telephone numbers. An additional text area 57 is associated with the "OTHER" check box 49. Finally, "SUBMIT" and "RESET" buttons 59 are provided to allow the user to either submit the form or to reset it.

The Java™ platform provides the developer with two user interface toolkits that may be used to build applications: the Abstract Windowing Toolkit, abbreviated AWT, and Swing. The AWT has a unique architecture, in that it is built on top of each platform's native toolkit and uses each platform's native components. For example, an AWT text field consists of the native toolkit's text field component, together with additional data. The underlying native component, called the "heavyweight peer," is used to provide much of the AWT component's functionality. For example, the AWT delegates the job of painting the component on the screen to the native toolkit. In this way, the AWT can be used to build applications that, on each platform, look and behave like the platform's native applications.

Swing, by contrast, contains no heavyweight peers. Instead, its components are "lightweight," that is, have no corresponding native components. In fact, the underlying native toolkit is unaware of Swing's components, so nearly all of the components' functionality must be provided by Swing.

When a user interacts with a computer by typing on the keyboard or clicking the mouse on different areas of the computer screen, the underlying native platform informs the appropriate application of the user's actions by means of native "events." These events are platform-specific and contain different information depending on the action that the user performed. For example, if the user typed a key on the keyboard, the underlying platform might generate a "key pressed" event when the key was pressed and a "key released event" when the key was released. The events will contain various information about the user action, such as which key was pressed and released or the state of the keyboard (e.g., the CAPS-LOCK key) during the user's actions.

As mentioned above, the events are generated by the underlying platform and are therefore platform-specific. Different platforms will generate different events in response to the same user actions, and the events themselves will contain different information depending on the platform that generated them. Another difference between platforms may be the way in which events are delivered to the appropriate application. On some systems, events might be placed on a queue, and it is the application's responsibility to dequeue the events and process them. On other systems, the application may register a special procedure, called an "event handler," with the underlying platform. This event handler will be called whenever the platform wishes to deliver an event to that application.

These platform differences in events and event delivery mechanisms are some of the reasons that, prior to the Java™ platform's introduction, it was impossible for developers to write applications that worked on multiple platforms without customizing the application for each platform. The Java™ user interface toolkits address this problem by providing a uniform event model for all platforms on which the Java™ platform is implemented. The Java™ implementation hides both the native delivery mechanism and the native events themselves from its applications by registering native handlers or dequeuing native events as appropriate. Then, based on the native events it receives, it generates the appropriate "Java™ events" and delivers them to its applications via a mechanism of its own (typically by calling Java™ event handlers registered by the Java™ application.)

Because different platforms generate different native events, it follows that there is not a one-to-one mapping between native events and Java™ events. Also, because native events on different platforms contain different information, in some cases platform-specific information may be omitted from a Java™ event, while in other cases information not present in a native event may need to be computed for inclusion in a Java™ event. It is the job of the Java™ implementation on each platform to unify these differences so that Java™ applications on different platforms receive the same sequence of Java™ events when exposed to the same user actions.

One class of Java™ events generated by the Java™ implementation on each platform are focus events. A component becomes the focus owner when it receives a FocusGained event, and it ceases being the focus owner when it receives a FocusLost event. The Java™ Standard Edition SDK, version 1.4 defines a new field in its focus events: the "opposite" field. In a FocusLost event, the opposite field specifies the component that is gaining focus in conjunction with this FocusLost event, that is, it specifies where the focus is going next. In a FocusGained event, the opposite field specifies the component that is losing focus in conjunction with this FocusGained event, that is, it specifies where the focus is coming from. Some native platforms, such as those running the various Windows operating systems, provide the opposite components in their native focus events, and those components can then be included in the corresponding Java™ events. However, the X windowing system, for example, does not provide this information, so Java™ implementations on X-based platforms must compute the opposite components for inclusion in the Java™ focus events.

Therefore, there is a need for a method for computing the information to include in opposite fields of Java™ focus events.

SUMMARY OF INVENTION

In one aspect, the invention relates to a method for generating information for inclusion in focus events which comprises maintaining a list of components requesting focus in a selected application and determining whether a target of a first focus event matches a component at the head of the list. If the target of the first focus event matches the component at the head of the list, the method further comprises marking the component at the head of the list for inclusion in an opposite field of a second focus event.

In another aspect, the invention relates to a method for generating information for inclusion in focus events which comprises maintaining a list of components requesting focus in a selected application and determining whether a target of a first focus event matches a component at the head of the list. If the target of the first focus event matches the component at the head of the list, the method further comprises marking the component at the head of the list for inclusion in an opposite field of a second focus event and marking a component next to the component at the head of the list for inclusion in an opposite field of the first focus event.

In another aspect, the invention relates to a computer-readable medium having stored thereon a program which is executable by a processor. The program comprises instructions for maintaining a list of components requesting focus in a selected application. The program further includes determining an opposite field of a first focus event and an opposite field of a second focus event based on a target of the first focus event, a target of the second focus event, and the list of components requesting focus.

Other aspects and advantages of the invention will be apparent from the following description and the appended claims.

DETAILED DESCRIPTION

Figure 1:
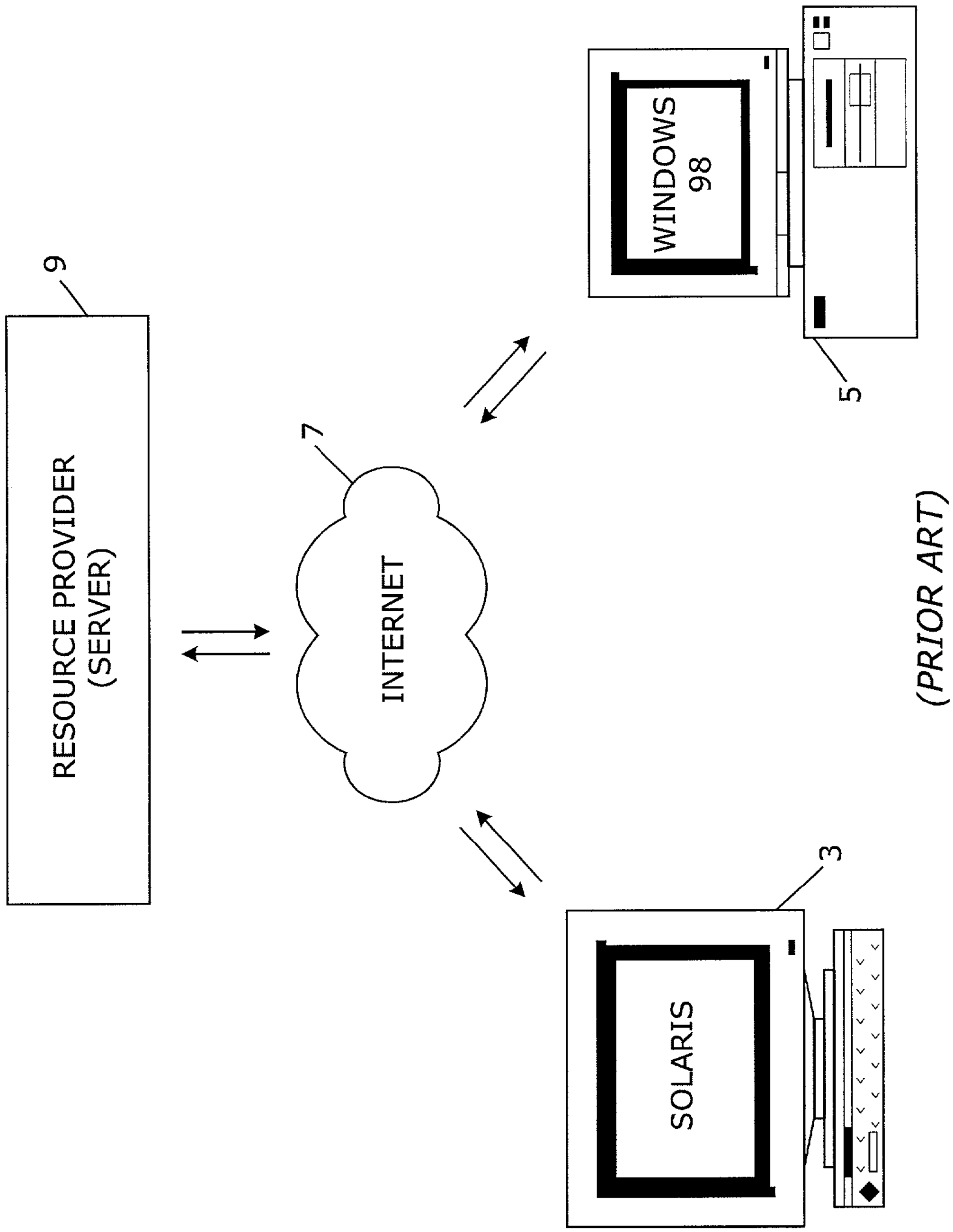
FIG. 1 illustrates a multiple platform environment.
Figure 2:
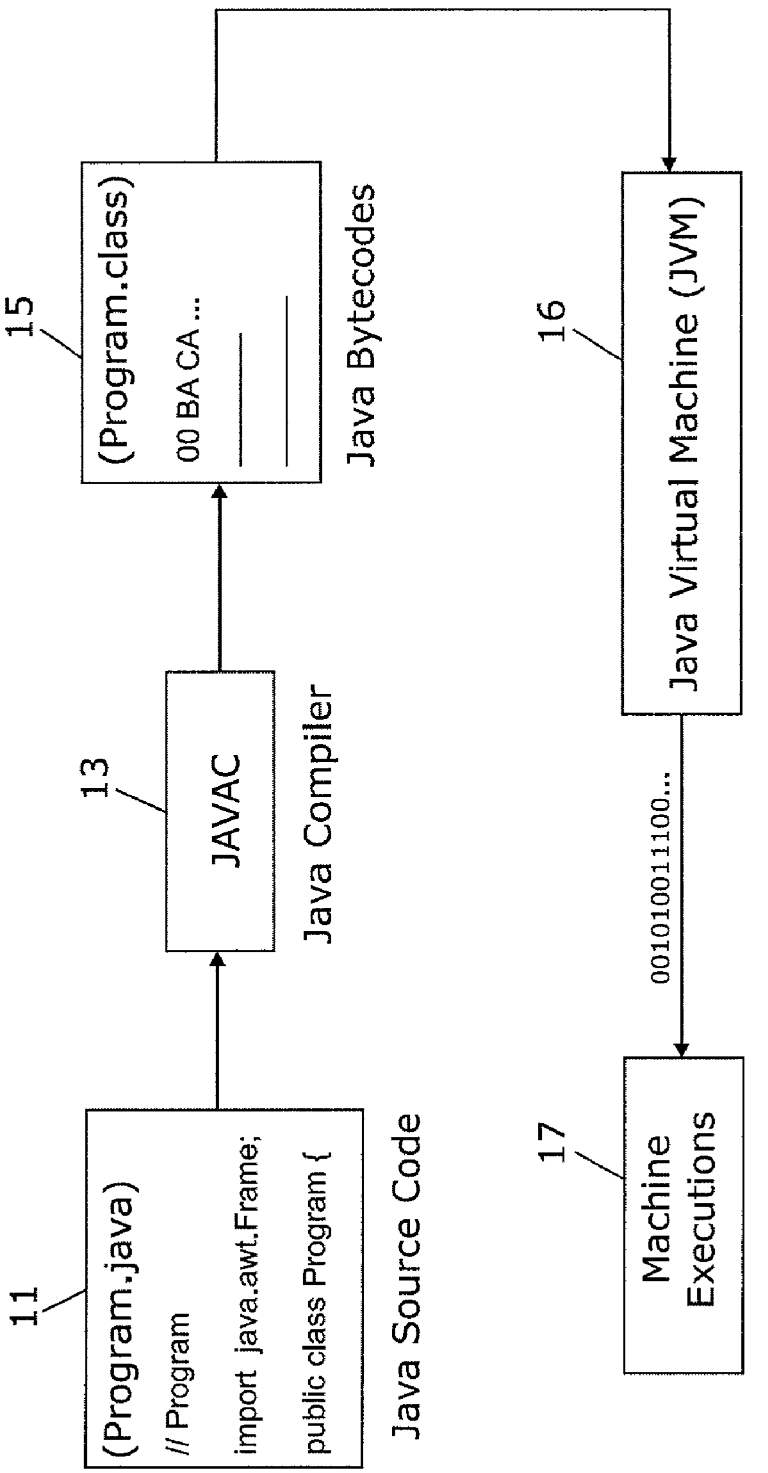
FIG. 2 illustrates a mechanism for creating Java™ applications.
Figure 3:
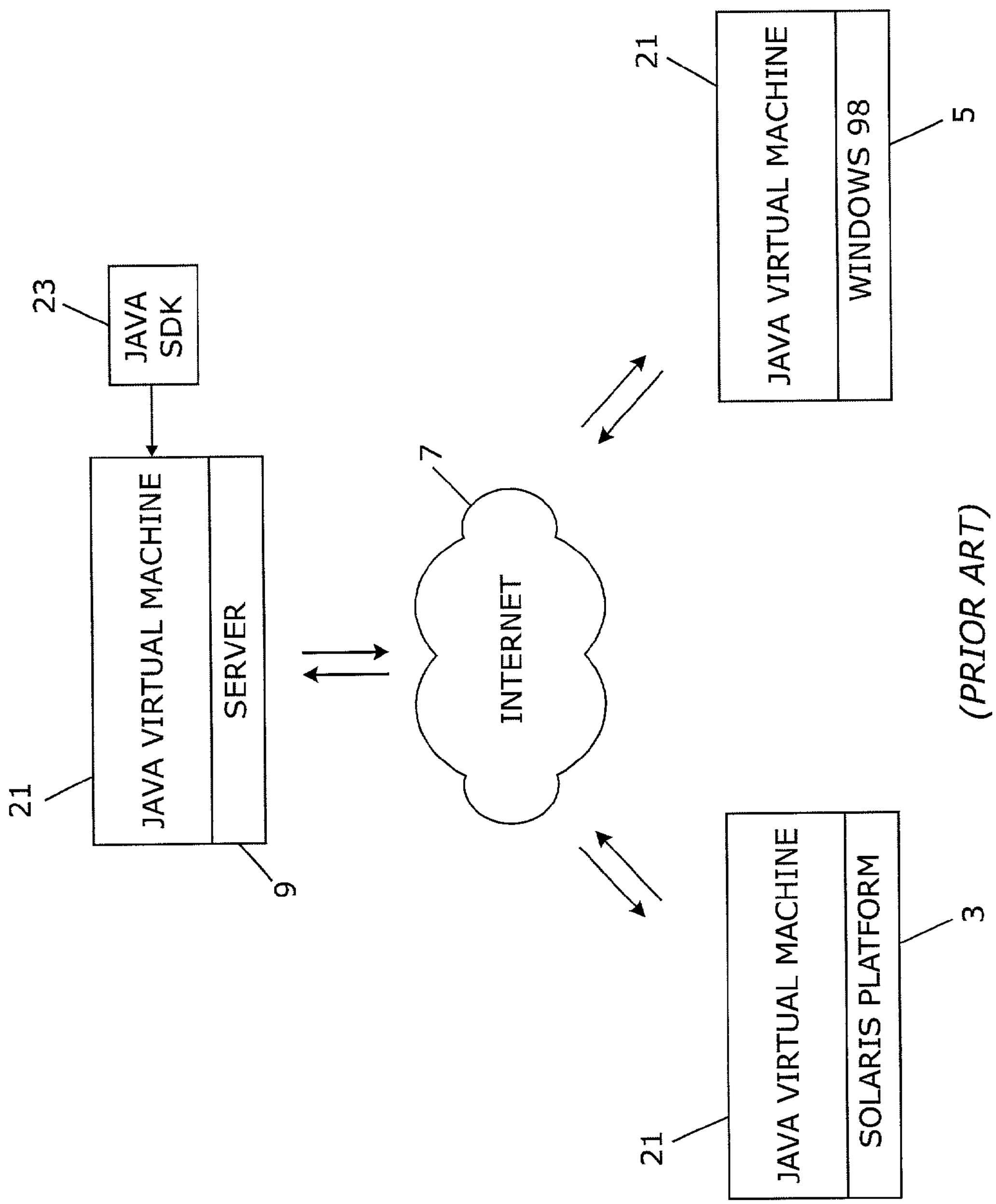
FIG. 3 illustrates a Java™ application running in a multiple platform environment.
Figure 4:
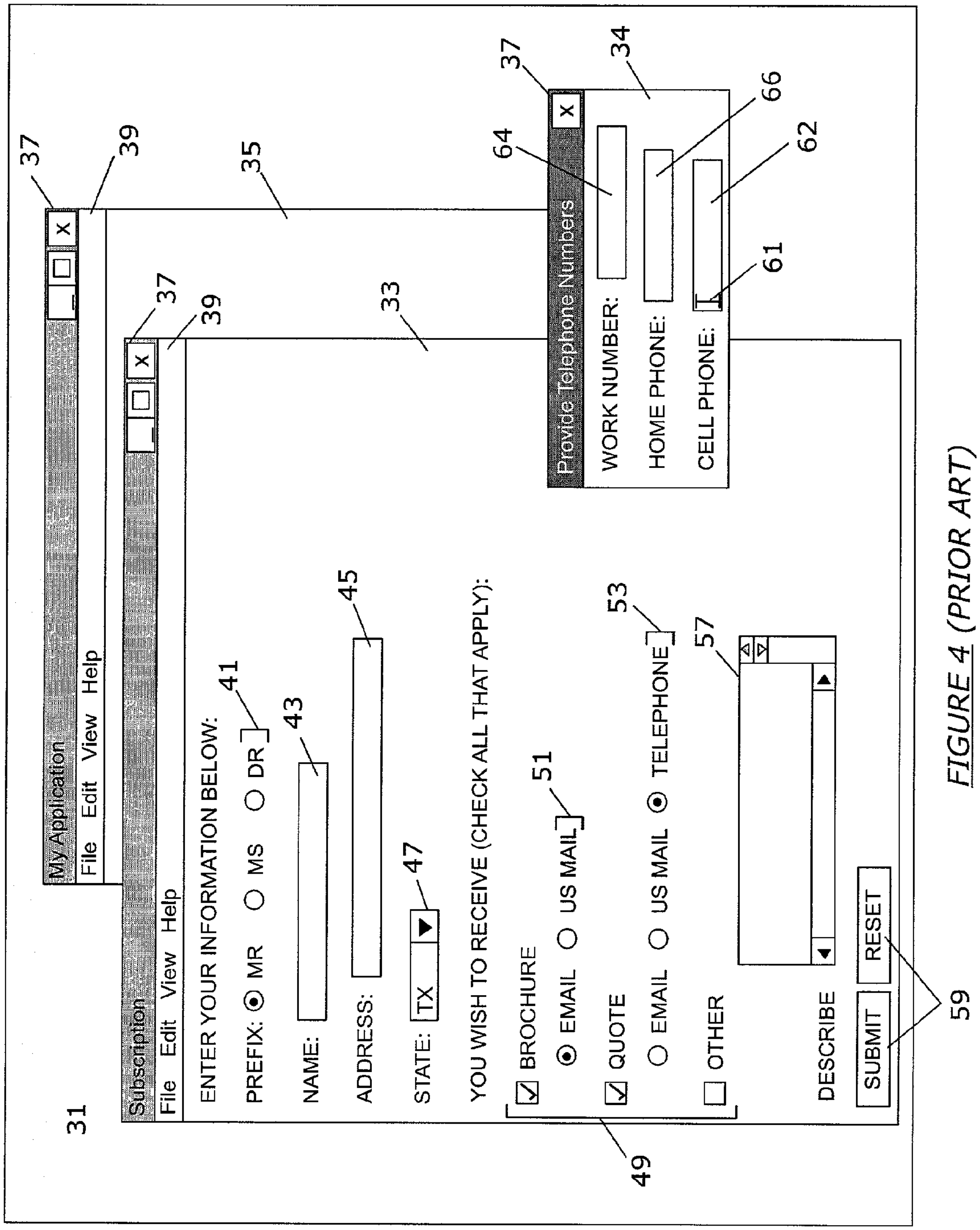
FIG. 4 illustrates a typical graphical user interface (GUI).

Specific embodiments of the invention will now be described in detail with reference to the accompanying drawings. Like elements in the various figures are denoted by the same reference numerals for consistency.

Figure 5:
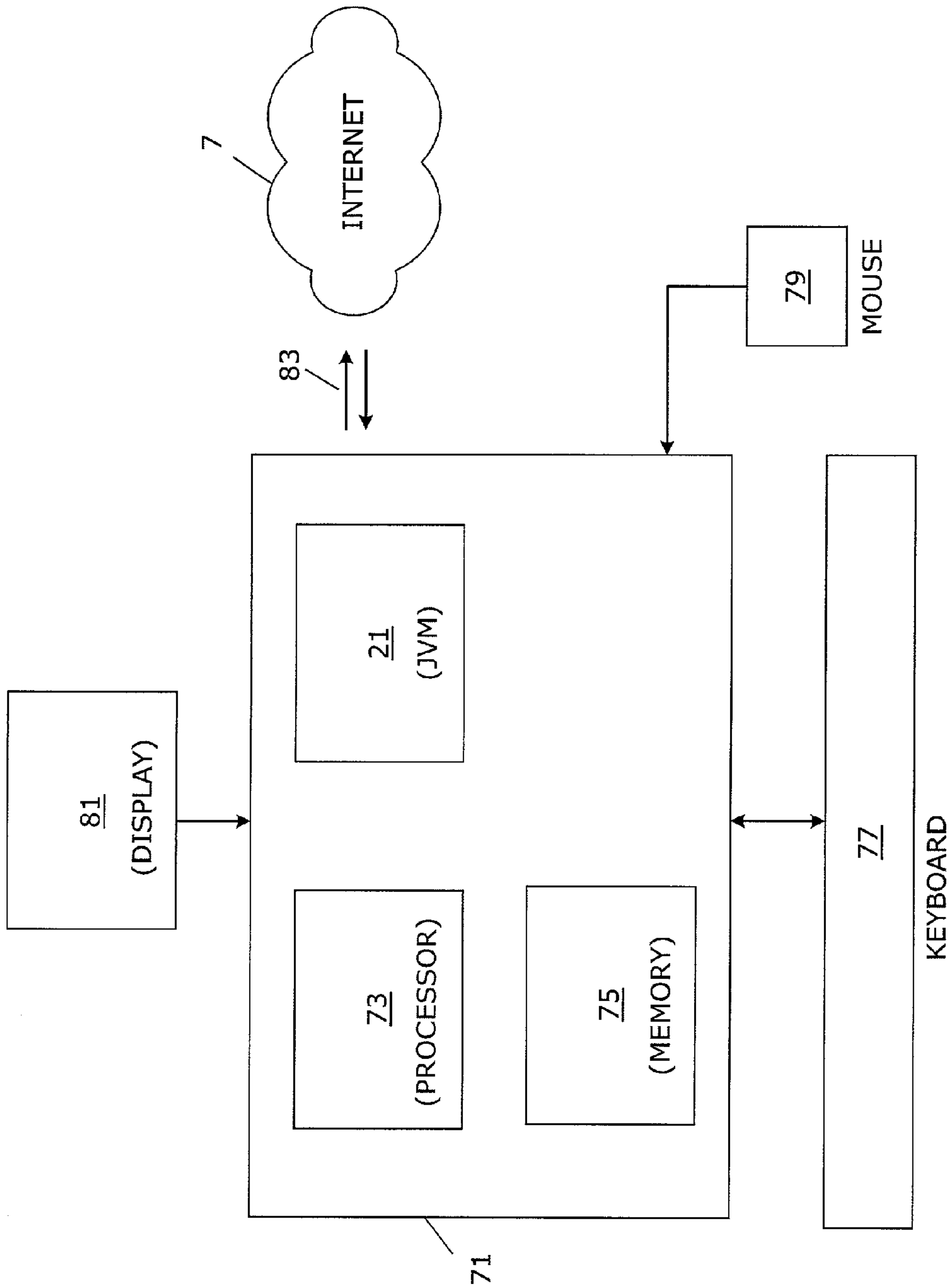
FIG. 5 illustrates a typical computer and its components as they relate to the Java™ virtual machine.

The invention described here may be implemented on virtually any type of computer regardless of the platform being used. For example, as shown in FIG. 5, a typical computer 71 will have a processor 73, associated memory 75, and numerous other elements and functionalities typical to today's computers (not shown). The computer 71 will have associated therewith input means such as a keyboard 77 and a mouse 79, although in an accessible environment these input means may take other forms. The computer 71 will also be associated with an output device such as a display 81, which may also take a different form in an accessible environment. Computer 71 is connected via a connection means 83 to the Internet 7. The computer 71 is configured to run a Java™ virtual machine 21, implemented either in hardware or in software.

The present invention provides a method for computing the information to include in "opposite" fields of Java™ focus events. The method works perfectly for computing such information whenever focus is transferred between components within the same top-level window. When focus transfers outside of the window, the method may fail and report the opposite component incorrectly or as "null". However, it will recover and report opposite components correctly upon subsequent, intra-window transfers.

The method relies on two observations about the circumstances under which Java™ focus events are generated due only to the operation of the Java™ application in question. The key observation is that such events are generated only as a result of one of two causes: either a Java™-level programmatic focus request, or a user button click on a focusable heavyweight component (resulting in a native focus request on that component). In each of these two cases, a pair of events is generated: a FocusLost event on the component that previously had focus, and a FocusGained event on the component requesting focus. Thus, our second observation is that, since application-caused Java™ focus events are always generated in such "lost/gained" pairs, computing the opposite component for FocusGained events is easy: it is the component on which a FocusLost event has just been generated. If there is no such FocusLost event, then focus is coming from somewhere outside the scope of our application; in that case, we use "null" as the opposite component.

On the other hand, in order to compute the opposite component for a FocusLost event, we would need to predict the future: we would need to know what FocusGained event will be generated next. We can't know this information for certain—for example, the focus change may not be internal to the application and focus may be going to an unrelated, native application window. Recall, however, that each focus request will typically result in a FocusGained event being generated. Thus, if we keep a queue of all the focus requests, we can use it to guess the opposite component for FocusLost events. When generating a FocusLost event, we would look at the first request on the queue, use the component making the request as the opposite component in the FocusLost event, and dequeue the request.

Figure 6:
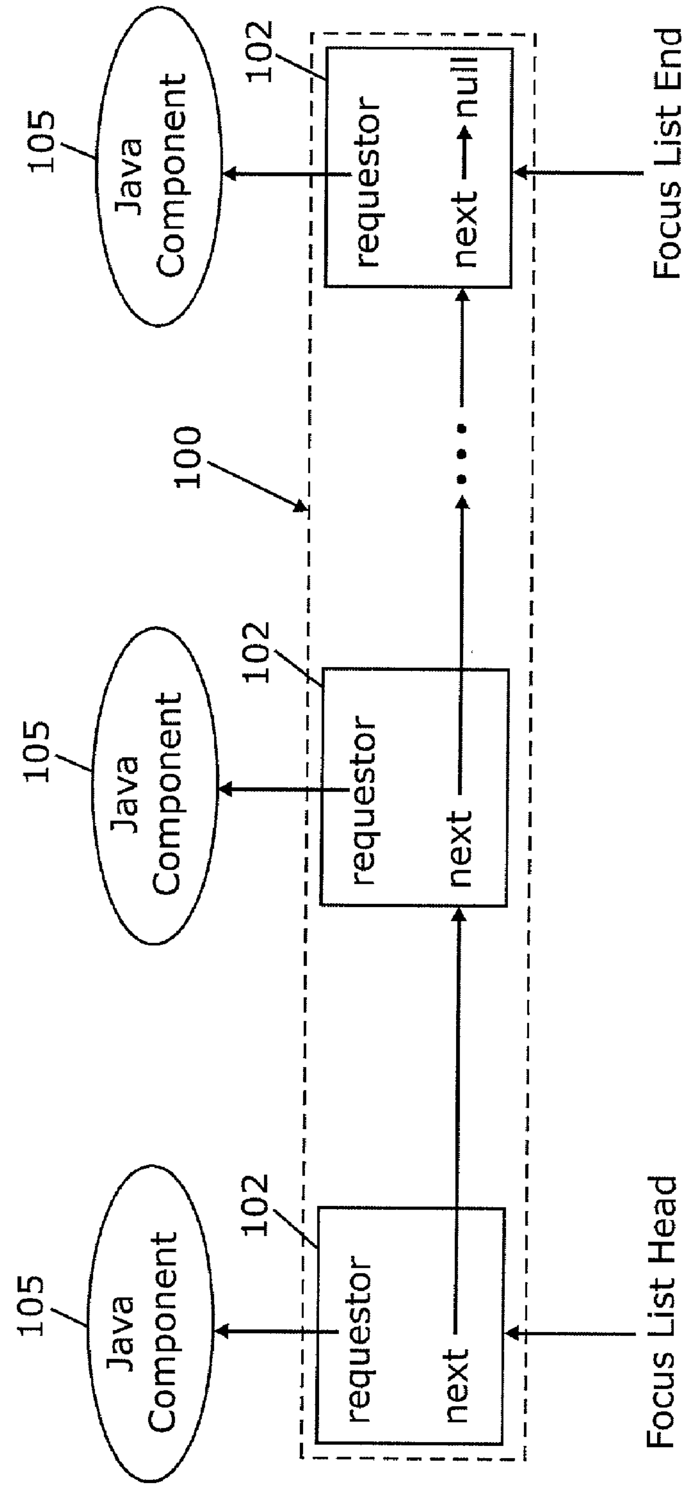
FIG. 6 is a graphical representation of a Focus List according to one embodiment of the invention.

In order to compute this information, a list of components that have issued either Java™ or native-level focus requests, but have not yet received focus notification events, is maintained. Herein, this list of components is referred to as the Focus List. FIG. 6 shows a graphical representation of the Focus List, generally identified by reference numeral 100. Focus List 100 can have zero, one, or more list elements 102. Each list element has a "requester" member and a "next" member. The "requester" member contains data that identifies a Java™ component 105 that has at some point in time issued either a Java™ or native-level focus request. The "next" member contains the memory location of the next element in the list. Two pointers called "Focus List Head" and "Focus List End" are maintained. Focus List Head points to the top of Focus List 100, and Focus List End points to the end of Focus List 100.

Figure 7:
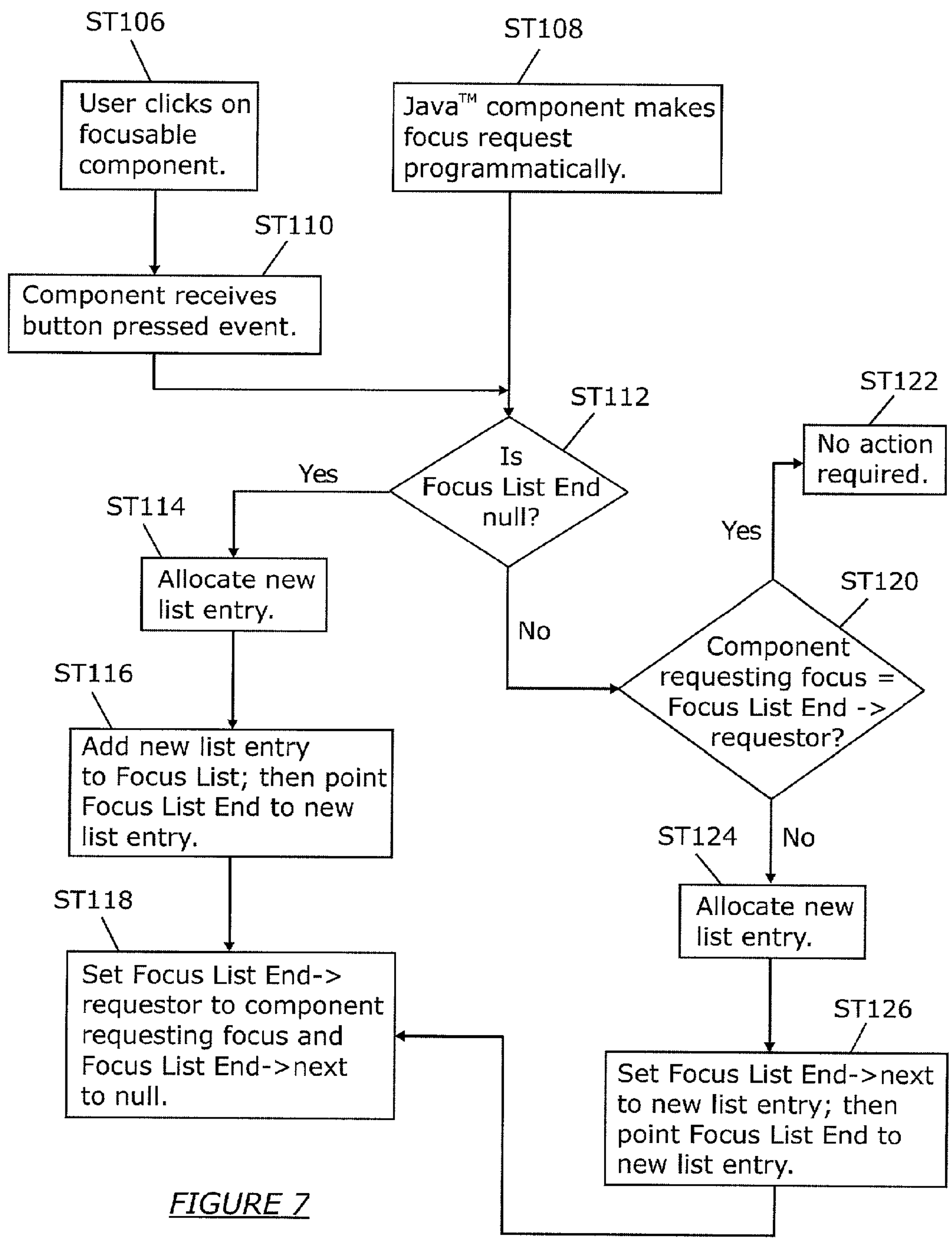
FIG. 7 is a flowchart illustrating how list elements are added to the Focus List shown in FIG. 6.

FIG. 7 is a flowchart that illustrates the process for adding list elements (102 in FIG. 6) to the Focus List (100 shown in FIG. 6). A new element is added to the Focus List whenever either a native-level focus request or a Java™ focus request is issued. In the native request scenario, a user clicks on a heavyweight focusable component (ST106), which results in the component receiving a native-level "button pressed" event (ST110) and in the underlying platform issuing a native-level focus request on behalf of the component. In the Java™ request scenario, a Java™ component issues a programmatic focus request (ST108) through a function invocation.

As illustrated, the process involves checking whether Focus List End is null (ST112), i.e., whether Focus List (100 in FIG. 6) is empty. If Focus List End is null, then memory allocation is made for a new list element (ST114). At step ST116, the new list element is added to the Focus List (100 in FIG. 6). Then, Focus List End is modified such that it points to the new list element. At step ST118, the "requestor" member of the element pointed to by Focus List End is set to the component requesting focus, and the "next" member of the element pointed to by Focus List End is set to null.

Returning to step ST112, if Focus List End is not null, then the process involves checking whether the component requesting focus is the same as the "requestor" member of the element pointed to by Focus List End (ST120). If the component requesting focus and the "requestor" member of the element pointed to by Focus List End are the same, then no action is required (ST122). Otherwise, memory allocation is made for a new list element (ST124). The "next" member of the element pointed to by Focus List End is set to the new list element, and Focus List End is then adjusted to point to the new list element (ST126). The "requester" member of the element pointed to by Focus List End is set to the component requesting focus, and the "next" member of the element pointed to by Focus List End is set to null (ST118).

Figure 8A:
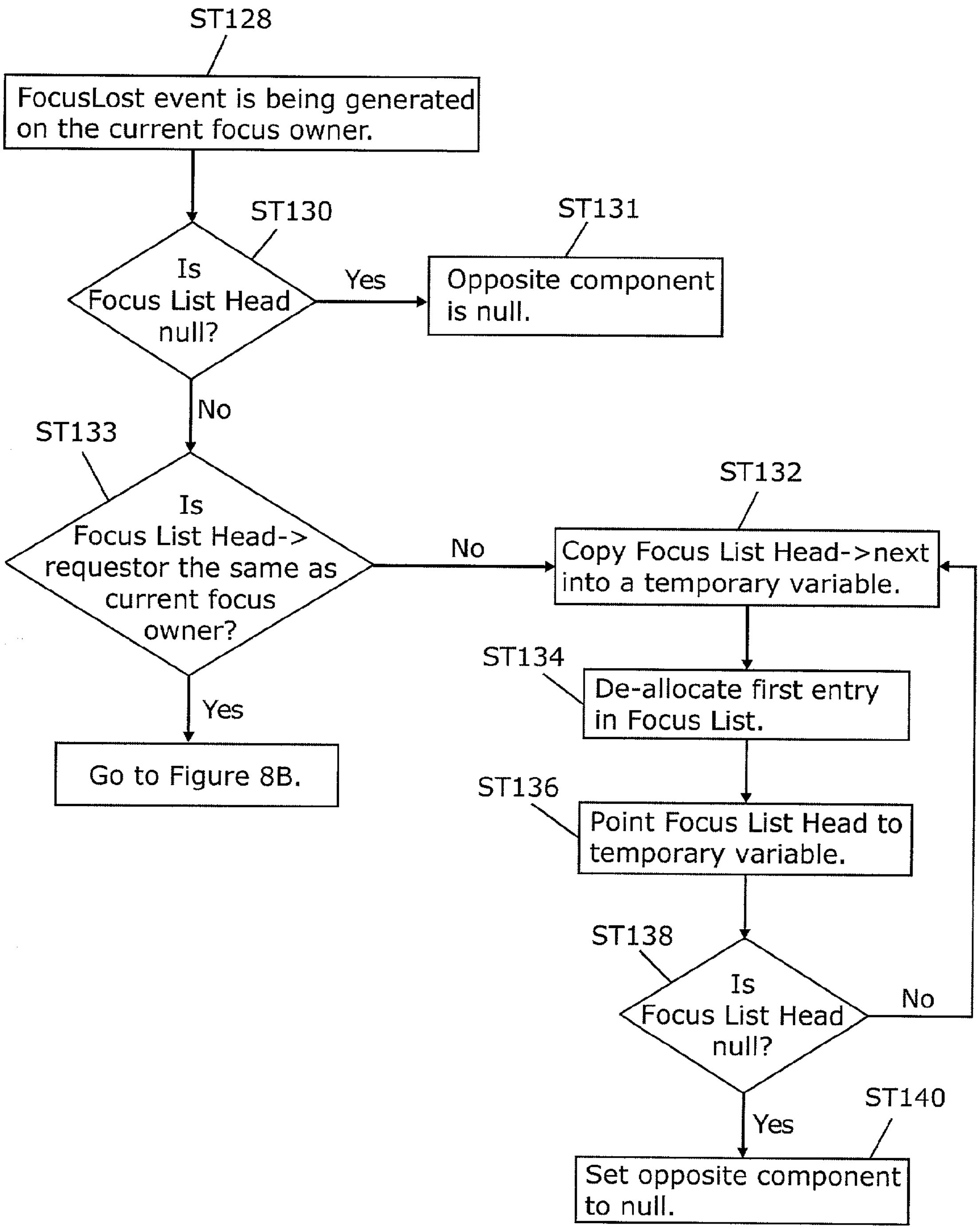
FIG. 8A is a flowchart illustrating how the opposite field for a FocusLost event is determined in accordance with one embodiment of the invention.

As Java™-level focus events are generated by the Java™ platform, the opposite component involved in the focus transfer is computed. FIG. 8A shows how to compute the opposite component when a FocusLost event is being generated for the component that currently has the focus (ST128). At this point, the process of determining the opposite component involves checking whether Focus List Head is null (ST130). If Focus List Head is null, there are no elements in the Focus List (100 in FIG. 6), and the opposite component for the FocusLost event is set to null (ST131), because no guess can be made as to where the focus is going (it is probably going out of the scope of this application). If Focus List Head is not null, the process involves determining whether the current focus owner matches the component at the head of the Focus List (100 in FIG. 6). If it does not, or if there are no components in the Focus List, then the FocusLost event also resulted from a focus request from outside of the current application, such as a user clicking on an unrelated window on the desktop. In this case, the opposite component for the FocusLost event is set to null. Then the Focus List (100 in FIG. 6) is cleared, because, once focus leaves the application, the queued up requests will be ignored and will not be resulting in focus events.

To clear the Focus List (100 in FIG. 6), the "next" member of the element pointed to by Focus List Head is copied into a temporary variable (ST132). The memory allocated to the list element pointed to by Focus List Head is then de-allocated (ST134). After this, Focus List Head is modified to point to the list element identified in the temporary variable (ST136). The process then checks whether Focus List Head is null (ST138). If Focus List Head is not null, steps ST132, ST134, and ST136 are repeated until Focus List Head becomes null. When Focus List Head becomes null, the opposite component for the FocusLost event is set to null (ST140).

Figure 8B:
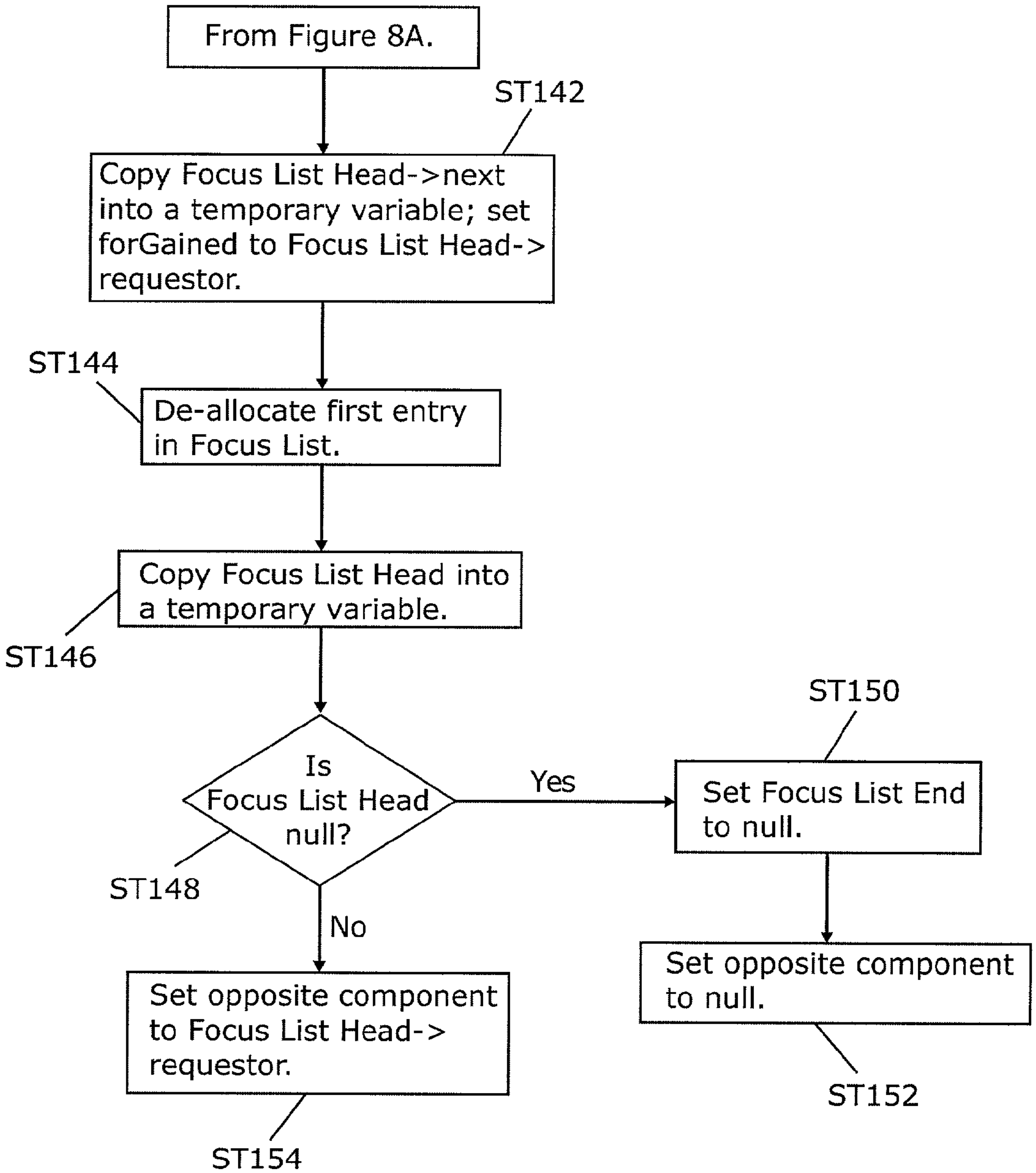
FIG. 8B is a continuation of FIG. 8A.

Returning to step ST133, if the "requester" member of the list element pointed to by Focus List Head is the same as the current focus owner, then the component identified by the "requester" member is saved as the opposite field for the next FocusGained event. FIG. 8B illustrates the process in detail. As shown, the "next" member of the list element at the head of the Focus List (100 in FIG. 6) is copied into a temporary variable, and the "requester" member of the list element is copied into a variable called "forGained" (ST142). Then the memory allocated to the element at the head of the Focus List (100 in FIG. 6) is de-allocated (ST144). Focus List Head is then modified to point to the list element identified in the temporary variable (ST146). The process continues with checking whether Focus List Head is null (ST148). If Focus List Head is null, then Focus List End is set to null (ST150), and the opposite component for the FocusLost event is set to null (ST152). If Focus List Head is not null, then the opposite component for the FocusLost event is set to the "requestor" member of the list element pointed to by Focus List Head (ST154).

Figure 9:
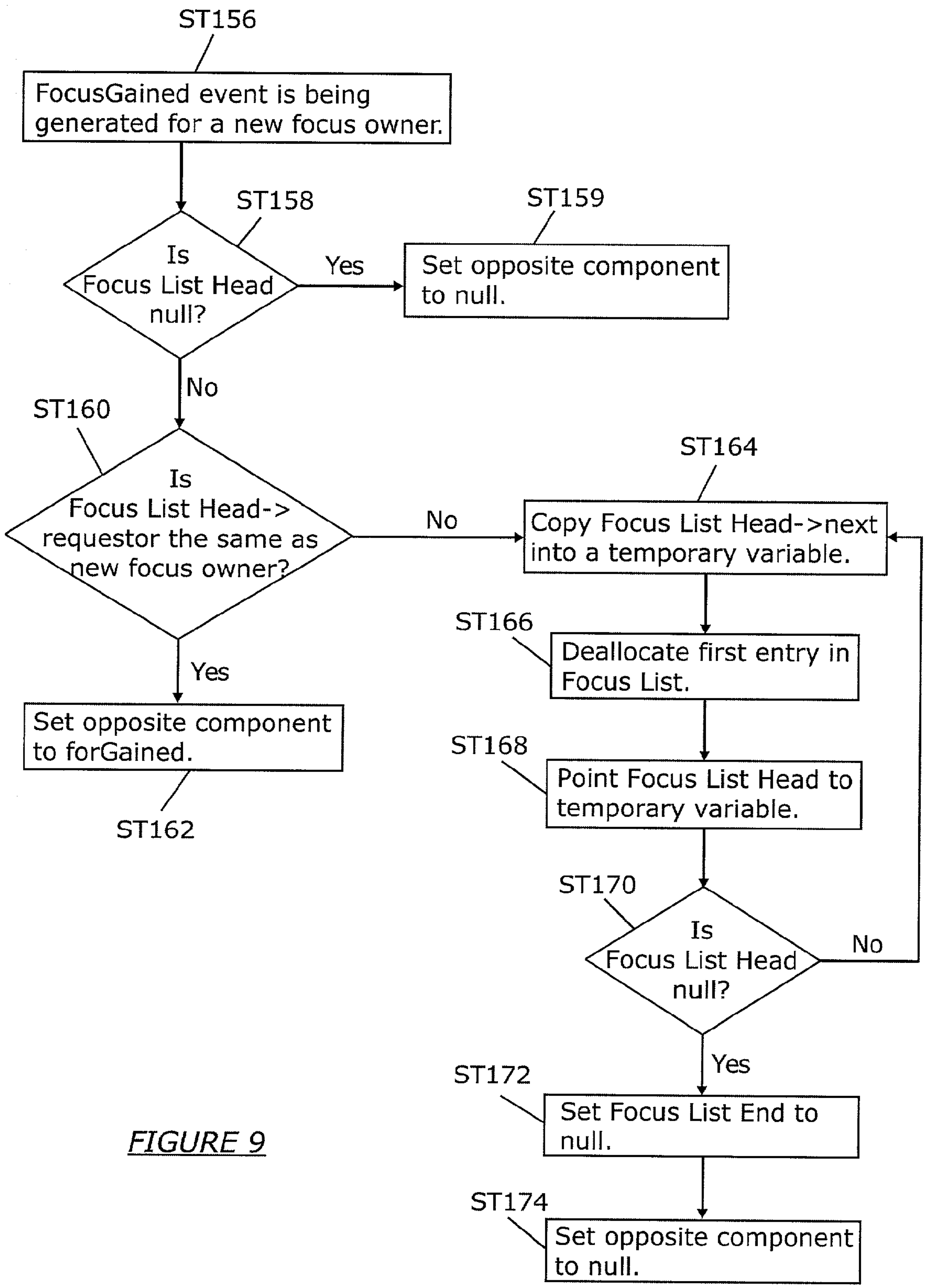
FIG. 9 is a flowchart illustrating how the opposite field for a FocusGained event is determined in accordance with one embodiment of the invention.

FIG. 9 illustrates how the opposite component for FocusGained events is generated (ST156). Focus List Head is first examined to see if it is null (ST158). If Focus List Head is null, this indicates that the FocusGained event is the result of something external to this application, and the opposite component for the FocusGained event is set to null (ST159). If Focus List Head is not null, the process involves checking whether the new focus owner matches the component at the head of the Focus List (ST160). If the new focus owner matches the component at the head of the Focus List (100 in FIG. 6), the opposite component for the FocusGained event is set to the component identified in the forGained variable (ST162).

Returning to step ST160, if the component at the head of the Focus List (100 in FIG. 6) does not match the new focus owner, then the FocusGained event is being generated on a component for which we are not expecting such an event. This may happen if, for example, focus had been transferred out of the scope of this application before all the focus events for the queued up requests had been generated, and is now being transferred back. This case requires the Focus List (100 in FIG. 6) to be cleared, because focus events corresponding to the requests on the list will not be generated. To clear the list, the "next" member of the list element at the head of the Focus List (100 in FIG. 6) is copied into a "temporary" variable (ST164). Then, the memory allocated to this list element is de-allocated (ST166). Focus List Head is modified to point to the list element identified by the temporary variable (ST168). At step ST170, the process further involves checking whether Focus List Head is null. If Focus List Head is not null, steps ST164, ST166, and ST168 are repeated until Focus List Head becomes null. When Focus List Head becomes null (ST172), Focus List End is set to null (ST174), and the opposite component for the FocusGained event is set to null (ST176).

The invention may provide general advantages in that it provides a method for computing the information required for opposite fields of focus events. The invention is useful when the native platform or native windowing toolkit does not normally provide this information. As described above, a list of components that have issued focus requests is maintained. The list is then used to determine the opposite information when focus events are processed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-readable medium having stored thereon a program which is executable by a processor, the program comprising instructions for:

maintaining a list of components requesting focus in a selected application;

determining whether a target of a first focus event matches a component at the head of the list; and if the target of the first focus event matches the component at the head of the list, marking the component at the head of the list for inclusion in an opposite field of a second focus event, wherein the first focus event and the second focus event are Java focus events.

2. The computer-readable medium of claim 1, wherein the focus events are generated as a result of a user clicking on a focusable component.

3. The computer-readable medium of claim 1, wherein the focus events are generated as a result of a component making a focus request through function invocation.

4. The computer-readable medium of claim 1, wherein the target of the first focus event is the current focus owner.

5. The computer-readable medium of claim 1, wherein determining whether the target of the first focus event matches the component at the head of the list comprises determining whether the list is empty.

6. The computer-readable medium of claim 5, wherein marking the component at the head of the list for inclusion in the opposite field of the second focus event comprises setting the opposite field of the first focus event to null if the list is empty.

7. The computer-readable medium of claim 5, further comprising clearing the list and setting the opposite field of the first focus event to null if the target of the first focus event does not match the component at the head of the list.

8. The computer-readable medium of claim 1, further comprising removing the component matching the target of the first focus event from the list and marking the next component in the list as the head of the list.

9. The computer-readable medium of claim 8, further comprising marking the component at the head of the list for inclusion in an opposite field of the first focus event.

10. The computer-readable medium of claim 9, wherein marking the component at the head of the list for inclusion in an opposite field of the first focus event comprises determining whether the list is empty.

11. The computer-readable medium of claim 10, wherein marking the component at the head of the list for inclusion in an opposite field of the first focus event further comprises setting the opposite field of the first focus event to null if the list is empty.

12. The computer-readable medium of claim 9, further comprising determining whether the list is empty when a target receives the second focus event.

13. The computer-readable medium of claim 12, further comprising setting the opposite field of the second focus event to null if the list is empty.

14. The computer-readable medium of claim 12, further comprising determining whether the target of the second focus event matches the component at the head of the list.

15. The computer-readable medium of claim 14, further comprising setting the opposite field of the second focus event to the component marked for inclusion in the opposite field of the second focus event if the target of the second focus event matches the component at the head of the list.

16. The computer-readable medium of claim 14, further comprising clearing the list if the target of the second focus event does not match the component at the head of the list and setting the opposite component of the second focus event to null.

17. The computer-readable medium of claim 12, wherein the target of the second focus event is the component gaining focus.

18. The computer-readable medium of claim 1, wherein maintaining the list of components comprises selectively adding a component requesting focus to the end of the list.

19. The computer-readable medium of claim 18, wherein selectively adding a component requesting focus to the end of the list comprises determining whether the list is empty.

20. The computer-readable medium of claim 19, wherein the component requesting focus is added to the end of the list if the list is empty.

21. The computer-readable medium of claim 18, wherein if the list is not empty, selectively adding a component requesting focus to the end of the list comprises determining whether the component requesting focus is the same as the component at the end of the list.

22. The computer-readable medium of claim 21, wherein the component requesting focus is added to the list if the component requesting focus is not the same as the component at the end of the list.

23. A computer-readable medium having stored thereon a program which is executable by a processor, the program comprising instructions for:

maintaining a list of components requesting focus in a selected application;

determining whether a target of a first focus event matches a component at the head of the list; and if the target of the first focus event matches the component at the head of the list, marking the component at the head of the list for inclusion in an opposite field of a second focus event and marking a component next to the component at the head of the list for inclusion in an opposite field of the first focus event, wherein the first focus event and the second focus event are Java focus events.

24. The computer-readable medium of claim 23, wherein the first focus event and the second focus event are generated as a result of a user clicking on a focusable component.

25. The computer-readable medium claim 23, wherein the first focus event and the second focus event are generated as a result of a component making a focus request through function invocation.

26. The computer-readable medium of claim 23, wherein the target of the first focus event is the component losing focus.

27. The computer-readable medium of claim 23, wherein determining whether the target of the first focus event matches the component at the head of the list comprises determining whether the list is empty.

28. The computer-readable medium of claim 27, wherein marking the component next to the component at the head of the list for inclusion in the opposite field of the first focus event comprises setting the opposite field of the first focus event to null if the list is empty.

29. The computer-readable medium of claim 27, further comprising clearing the list and setting the opposite field of the first focus event to null if the target of the first focus event does not match the component at the head of the list.

30. The computer-readable medium of claim 23, wherein marking the next component for inclusion in the opposite field of the first focus event comprises removing the component matching the target of the first focus event from the list and subsequently determining whether the list is empty.

31. The computer-readable medium of claim 30, wherein marking the next component for inclusion in the opposite field of the first focus event further comprises setting the opposite field of the first focus event to null if the list is empty.

32. The computer-readable medium of claim 23, further comprising determining whether the list is empty when a target receives the second focus event.

33. The computer-readable medium of claim 32, further comprising setting the opposite field of the second focus event to null if the list is empty.

34. The computer-readable medium of claim 32, further comprising determining whether the target of the second focus event matches the component at the head of the list.

35. The computer-readable medium of claim 34, further comprising setting the opposite field of the second focus event to the component marked for inclusion in the opposite field of the second focus event if the target of the second focus event matches the component at the head of the list.

36. The computer-readable medium of claim 34, further comprising clearing the list if the target of the second focus event does not match the component at the head of the list and setting the opposite component of the second focus event to null.

37. The computer-readable medium of claim 32, wherein the target of the second focus event is the component gaining focus.

38. The computer-readable medium of claim 23, wherein maintaining the list of components comprises selectively adding a component requesting focus to the end of the list.

* * * * *